E. E. PROULX.
ANTISKIDDING DEVICE.
APPLICATION FILED NOV. 30, 1915.
1,242,238.
Patented Oct. 9, 1917.
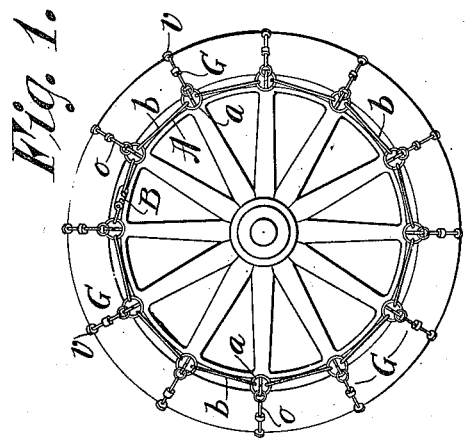
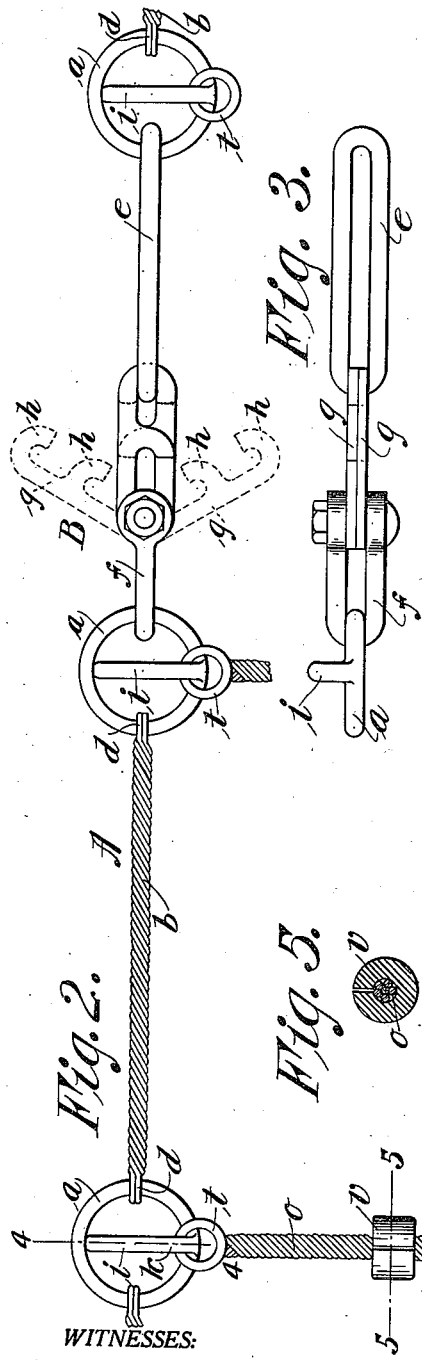
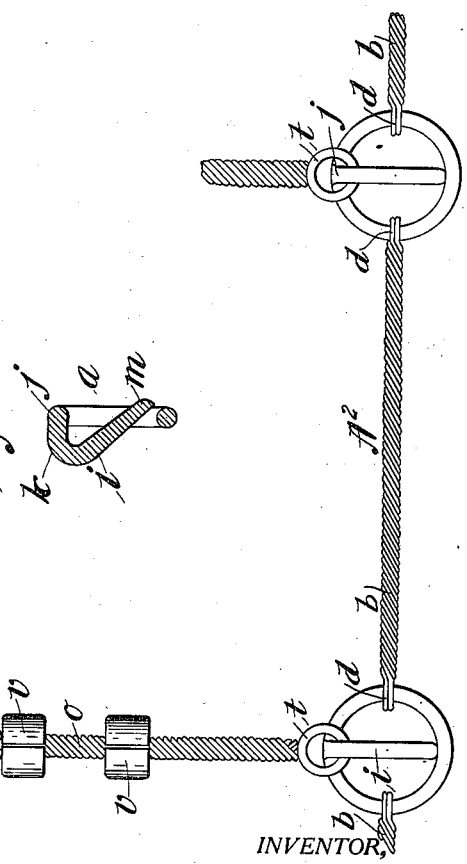
WITNESSES:
B. A. Leaver
INVENTOR,
Ernest E. Proulx,
BY
Wm. J. Bellm
ATTORNEY.

UNITED STATES PATENT OFFICE.

ERNEST E. PROULX, OF WILLIMANSETT, MASSACHUSETTS.

ANTISKIDDING DEVICE.

1,242,238. Specification of Letters Patent. Patented Oct. 9, 1917.

Application filed November 30, 1915. Serial No. 64,236.

*To all whom it may concern:*

Be it known that I, ERNEST E. PROULX, a citizen of the United States of America, and resident of Willimansett, in the county of Hampden and State of Massachusetts, have invented certain new and useful Improvements in Antiskidding Devices, of which the following is a full, clear, and exact description.

This invention relates to a device or appliance for a tire-provided wheel for the prevention of skidding, by failure of traction, on wet and slippery, or on muddy roads.

A particular object of the invention is to provide an attachment or appliance of the character indicated in which the jointed parts composing the device are unlike, and to eliminate the inclusion of link-chains, and by the improved character thereof conduce to increased durability and length of wear of the device with no lessened, if not increased, efficiency.

Another important object of the invention is to provide an anti-skid device in which, while the liability of breakage of the component members is greatly decreased, the removal and replacement of broken and partially disconnected parts, which in the running of the vehicle will be centrifugally thrown for injurious effects and annoyance, may be most easily and quickly accomplished.

The invention is described in conjunction with the accompanying drawings and is set forth in the claims.

In the drawings:—

Figure 1 is a side elevation of a tire provided automobile wheel showing the present improved device thereon.

Fig. 2 is a plan view, on a larger scale, of a sufficient portion of the anti-skid attachment to show the detail structural character thereof.

Fig. 3 is a view showing the means of connection of one of the side members of the device taken as seen at a right angle to the representation thereof in Fig. 2.

Fig. 4 is a view of one element of a series as taken on line 4—4, Fig. 2, and

Fig. 5 is a like view as taken on line 5—5 of Fig. 2.

In the drawings, A and $A^2$ represent opposite attachment members so made as to form, in substance, rings or bands to extend around the opposite sides of the wheel, preferably near the flanks of the tire or the wheel rim.

One or both of these side members is provided with a device B for connecting the ends thereof and for making the same circularly continuous.

The side members include spaced metal ring or eye members $a$ $a$ and connected twisted cables $b$ $b$ formed with end eyes $d$ $d$ which are interengaged with the rings $a$.

While the parts of the side member are to be adjoined and rendered continuous, one of the rings $a$ has an elongated link $e$ connected therewith, and another adjacent ring $a$ has a clevis or loop $f$ connected therewith and which is pivoted thereto, the plates $g$ $g$ having hooks $h$ formed at their inner edges and adapted when the parts $g$ $g$ are swung to coincidence to constitute closed eyes for the detachable connection therein of the link $e$.

The aforementioned rings or eye members $a$ are provided with diametrical fingers $i$ each having one end $j$ integral with the ring and having its portion $k$ adjacent the place of its integral connection with the ring proper, bowed transversely or to one side from the plane of the ring and extended obliquely across such plane, and having its free end $m$ terminating in slight separation from the opposite side portion of the ring as particularly shown in Fig. 4.

The members G of the device, arranged to cross from side to side over the tread of the tire, consist each of a pair of transversely arranged twisted wire cable sections $o$ $o$ having eyes $t$ $t$ and $u$ $u$ at their ends, the ones $u$ $u$ at the adjacent ends of the cable sections being interengaged with each other, while the outer eyes $t$ of such sections have detachable connections with the bowed parts $k$ of the said fingers $i$ of the rings $a$.

The said cable sections $o$ $o$ have enlargements $v$ $v$ in the form of buttons or knobs at either side of their interengaged eyes $u$ $u$.

These buttons or knob forming enlargements may be composed of split bulky rings of suitable metal as iron or steel with central openings therethrough, and when, in the manufacture of the parts they are brought to encircling relations to the twisted wire cable sections, and caused to engage such sections by being subjected to heavy pressure.

The wire cable sections themselves afford good tractional effects, increased, however, by the provision of the enlargements $v$ $v$.

In case one or a few of the transverse members which are extended across the tread become broken so as to have a tendency to fly outwardly by a centrifugal force to rapidly strike the mud guard, these broken parts may be readily detached from their end connections with the side members, and either immediately replaced or the but partially impaired device may be continued in use until a convenient time for the replacement.

I claim:—

1. In an anti-skid device, opposite side members each consisting of rings connected by flexible connectors, and cross members connecting the side members and each consisting of a pair of cable lengths having terminal eyes that pivotally connect the lengths and likewise connect the cross members to the side members, and anti-skid means on each length of cable.

2. In an anti-skid device for tires, opposite side members including attaching fingers, and cross members each comprising a pair of cables having interengaging eyes at their inner ends and eyes at their outer ends detachably engaged with the fingers of said side members.

Signed by me at Springfield, Mass., in presence of two subscribing witnesses.

ERNEST E. PROULX.

Witnesses:
G. R. DRISCOLL,
J. D. LONG.